United States Patent
Worth et al.

(10) Patent No.: US 12,253,873 B2
(45) Date of Patent: Mar. 18, 2025

(54) SYSTEMS AND METHODS FOR CONTROLLING AN ENERGY SUPPLY SYSTEM

(71) Applicant: PowerSecure Inc., Durham, NC (US)

(72) Inventors: Marshall Worth, Durham, NC (US); Camilo Calderon, Durham, NC (US); Keith Klaus, Durham, NC (US)

(73) Assignee: PowerSecure Inc., Durham, NC (US)

( * ) Notice: Subject to any disclaimer, the term of this patent is extended or adjusted under 35 U.S.C. 154(b) by 0 days.

(21) Appl. No.: 16/832,350

(22) Filed: Mar. 27, 2020

(65) Prior Publication Data
US 2020/0310479 A1    Oct. 1, 2020

Related U.S. Application Data

(60) Provisional application No. 62/825,117, filed on Mar. 28, 2019.

(51) Int. Cl.
*G05F 1/66* (2006.01)
*G05B 13/02* (2006.01)
(Continued)

(52) U.S. Cl.
CPC ............ *G05F 1/66* (2013.01); *G05B 13/026* (2013.01); *G06Q 10/04* (2013.01); *G06Q 50/06* (2013.01);
(Continued)

(58) Field of Classification Search
CPC ........ G05F 1/66; G05B 13/026; G06Q 10/04; G06Q 50/06; H02J 3/28; H02J 3/32;
(Continued)

(56) References Cited

U.S. PATENT DOCUMENTS

| | | | | |
|---|---|---|---|---|
| 8,294,420 B2* | 10/2012 | Kocher | ................... | B60L 53/64 |
| | | | | 320/124 |
| 9,002,531 B2* | 4/2015 | Mansfield | ............... | H02J 3/003 |
| | | | | 700/291 |

(Continued)

FOREIGN PATENT DOCUMENTS

JP          09215192 A  *  8/1997  ................ H02J 3/00

OTHER PUBLICATIONS

W. Jie-sheng and Z. Qing-wen, "Short-term electricity load forecast performance comparison based on four neural network models," The 27th Chinese Control and Decision Conference (2015 CCDC), 2015, pp. 2928-2932, doi: 10.1109/CCDC.2015.7162426. (Year: 2015).*

(Continued)

*Primary Examiner* — M. N. Von Buhr
(74) *Attorney, Agent, or Firm* — FisherBroyles, LLP; James J. Pohl

(57) ABSTRACT

Provided are methods and apparatus for controlling an energy supply system. In an example the energy supply system includes a battery. In an example, provided is a computer-implemented method for controlling a battery. At least a portion of the method can be performed by a computing device including a processor. The method can include (i) creating, using a machine-learning model, a load prediction curve for a load for a current day, (ii) analyzing, to control peak energy use from an electric power source at a specific time, the load prediction curve to identify the specific time and a respective quantity of energy to transfer between the battery and a bus coupled between the electric power source and the load, and (iii) generating a battery controller input based on the identified respective quantity of energy to transfer. Various other methods, systems, and computer-readable media are also disclosed.

21 Claims, 11 Drawing Sheets

(51) Int. Cl.
*G06Q 10/04* (2023.01)
*G06Q 50/06* (2024.01)
*H02J 3/28* (2006.01)
*H02J 3/32* (2006.01)

(52) U.S. Cl.
CPC ............... *H02J 3/28* (2013.01); *H02J 3/32* (2013.01); *Y02B 70/3225* (2013.01); *Y04S 20/222* (2013.01)

(58) Field of Classification Search
CPC .. H02J 2203/20; Y02B 70/3225; Y02E 60/00; Y04S 20/222; Y04S 10/50; Y04S 40/20
See application file for complete search history.

(56) References Cited

U.S. PATENT DOCUMENTS

| | | | | |
|---|---|---|---|---|
| 2007/0282495 | A1* | 12/2007 | Kempton | B60L 8/00 701/22 |
| 2011/0234150 | A1* | 9/2011 | Furukawa | B60L 53/51 320/101 |
| 2013/0178991 | A1* | 7/2013 | Gheerardyn | G06Q 10/06 700/286 |
| 2013/0241485 | A1* | 9/2013 | Snyder | B60L 53/64 320/109 |
| 2014/0018969 | A1* | 1/2014 | Forbes, Jr. | H02J 3/32 700/295 |
| 2015/0039146 | A1* | 2/2015 | Wei | H02J 3/14 700/291 |
| 2015/0077054 | A1* | 3/2015 | Uyeki | B60L 53/11 320/109 |
| 2017/0250571 | A1* | 8/2017 | Brooks | H02J 13/0062 |
| 2018/0090943 | A1* | 3/2018 | Wu | H02J 7/0029 |
| 2018/0175624 | A1* | 6/2018 | Trifonov | H02J 13/00002 |
| 2018/0254632 | A1* | 9/2018 | Elbsat | H02J 3/00 |
| 2019/0065689 | A1* | 2/2019 | O'Malley | G16H 50/50 |
| 2019/0147551 | A1* | 5/2019 | Sun | H02J 3/008 700/291 |
| 2020/0286105 | A1* | 9/2020 | Joseph | G06N 20/00 |
| 2021/0075242 | A1* | 3/2021 | Wu | H02J 7/0047 |
| 2021/0405493 | A1* | 12/2021 | Tinianov | H02S 40/20 |

OTHER PUBLICATIONS

M. Gentil, A. Galeazzi, F. Chiariotti, M. Polese, A. Zanella and M. Zorzi, "A Deep Neural Network Approach for Customized Prediction of Mobile Devices Discharging Time," GLOBECOM 2017—2017 IEEE Global Communications Conference, 2017, pp. 1-6, doi: 10.1109/GLOCOM.2017.8254532. (Year: 2017).*

A. Hariharan, G.G. Karady and P.E.J. Dickinson, "Application of Machine Learning Algorithm to Forecast Load and Development of a Battery Control Algorithm to Optimize PV System Performance in Phoenix, Arizona," 2018 North American Power Symposium (NAPS), 2018, pp. 1-6, doi: 10.1109/NAPS.2018.8600594 (Year: 2018).*

* cited by examiner

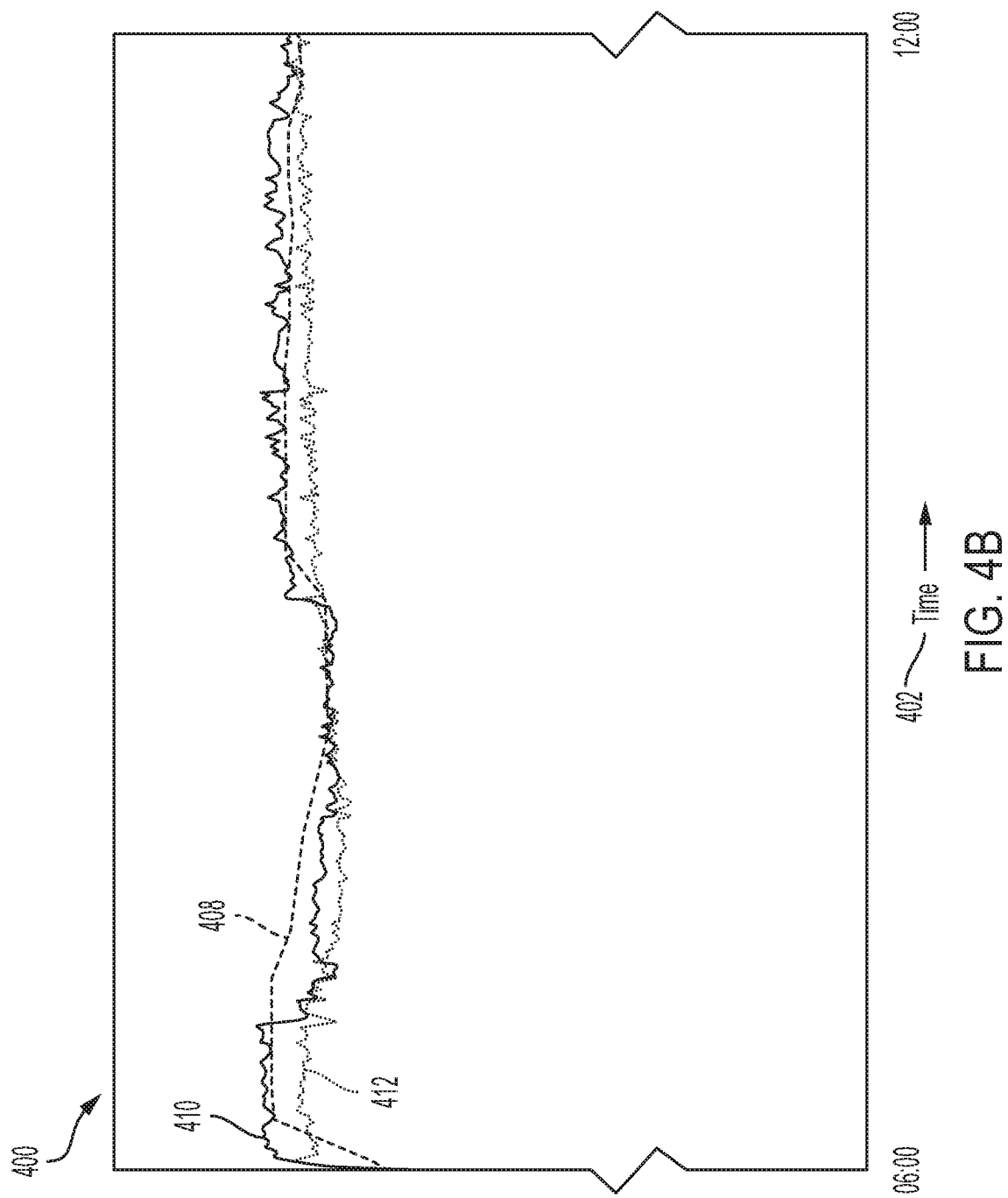

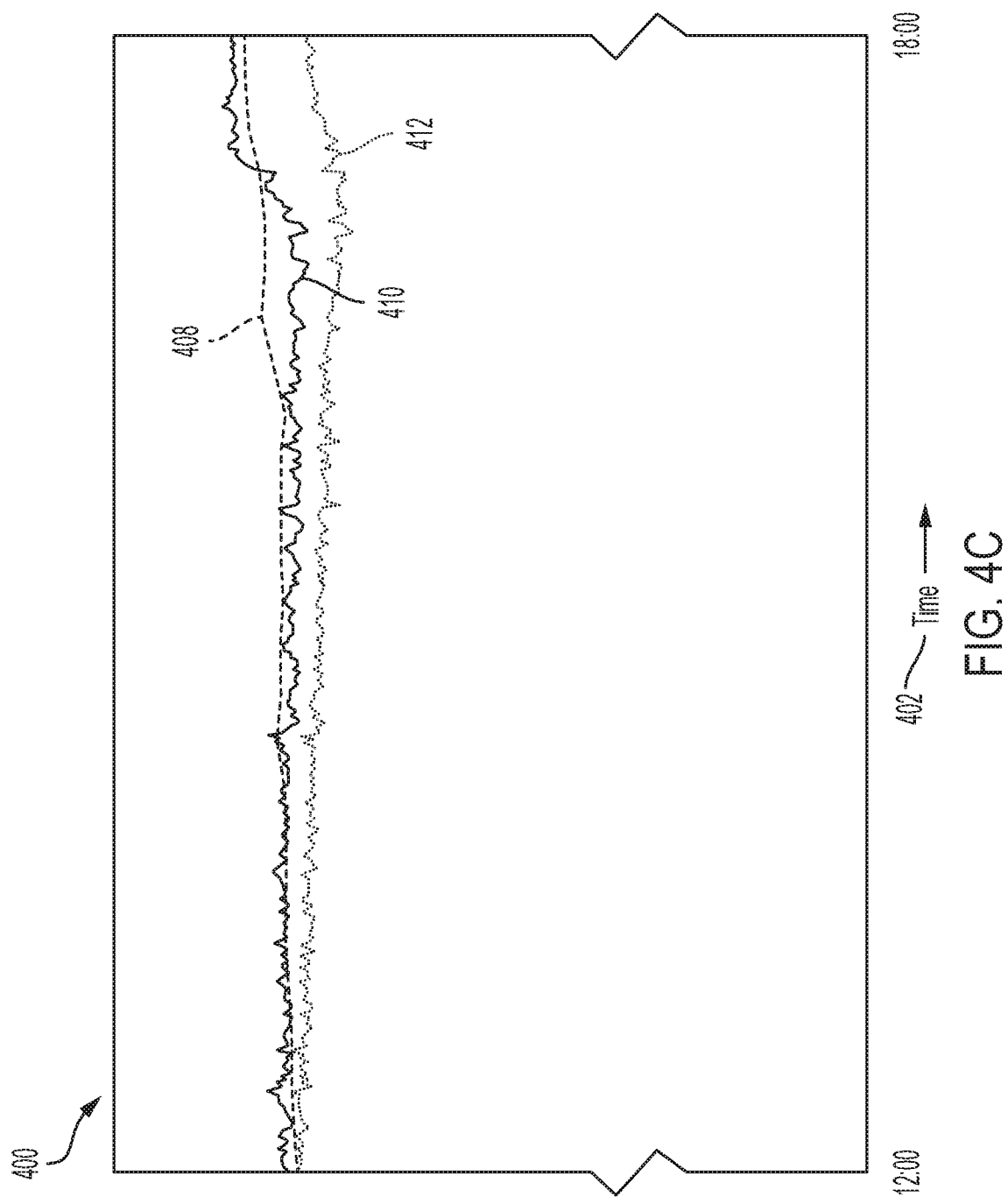

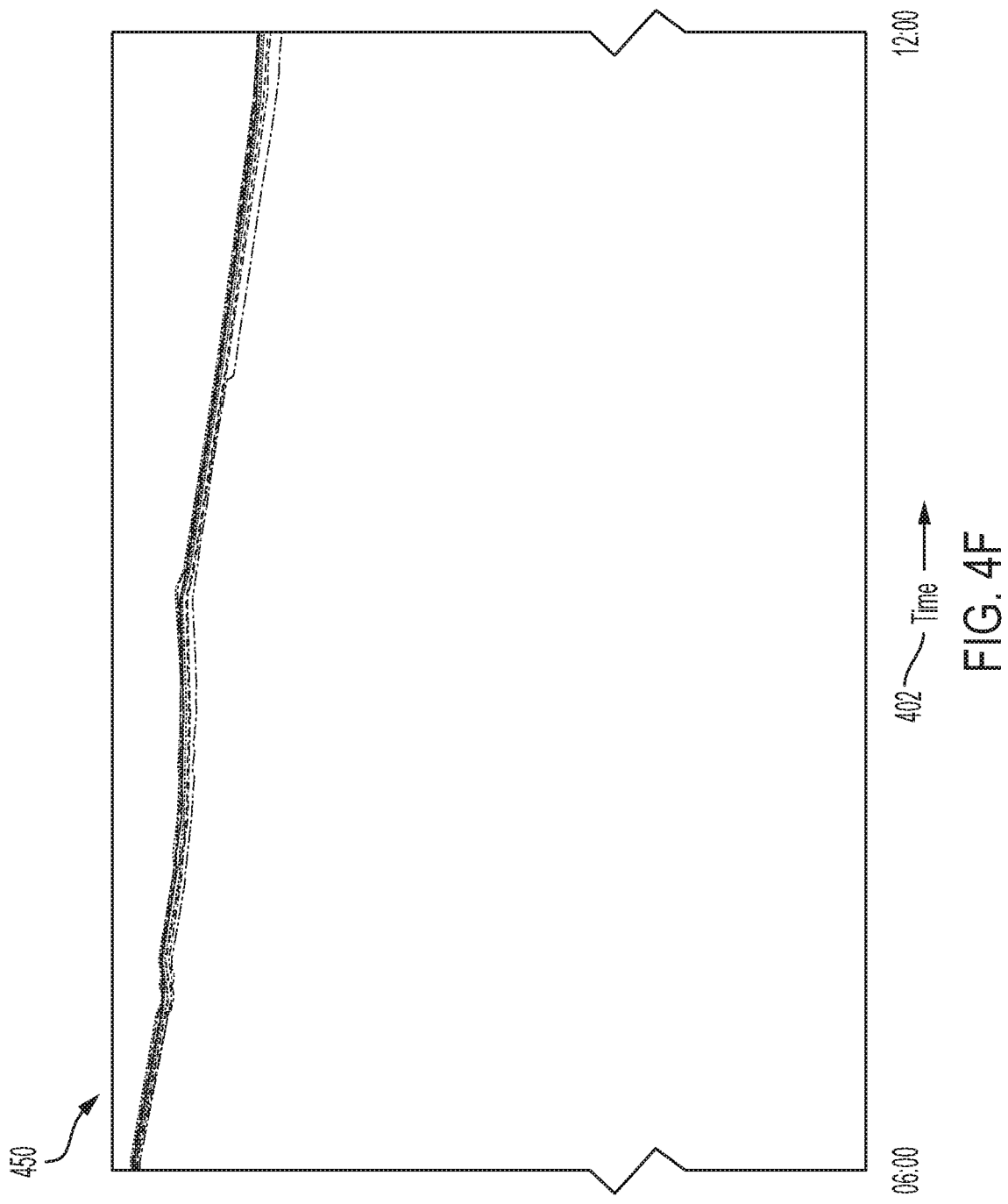

SYSTEMS AND METHODS FOR CONTROLLING AN ENERGY SUPPLY SYSTEM

CROSS-REFERENCE TO RELATED APPLICATION

This application claims the benefit of U.S. Provisional Patent Application No. 62/825,117, titled "SYSTEMS AND METHODS FOR CONTROLLING AN ENERGY SUPPLY SYSTEM", filed Mar. 28, 2019, the disclosure of which is incorporated herein by reference in its entirety.

FIELD OF DISCLOSURE

This disclosure relates generally to the technical field of electronics, and more specifically, but not exclusively, to methods and apparatus which control an energy supply system.

BACKGROUND

Electric power demand by utility customers may vary day-to-day and may have periods of peak demand. Thus, electric power providers such as utility companies design electric power generation systems and electric power distribution systems with capacity exceeding that of average loading to meet periods of peak demand in order to maintain continuity of service (e.g., to avoid blackouts) and to reduce occurrences of supplying electric power having reduced voltages (also known as "brownouts"). Electric power providers pass expenses relating to providing this additional infrastructure to customers of the electric power providers in different forms such as peak demand charges, demand charges, time-of-use rates, and market-based rates. Accordingly, there are previously unaddressed and long-felt industry needs for methods and apparatus which improve upon conventional methods and apparatus.

SUMMARY

In an example, a computer-implemented method for controlling a battery can include (i) creating, using a machine-learning model, a load prediction curve for a load for a current day, (ii) analyzing, to control peak energy use from an electric power source at a specific time, the load prediction curve to identify the specific time and a respective quantity of energy to transfer between the battery and a bus coupled between the electric power source and the load, and (iii) generating a battery controller input based on the identified respective quantity of energy to transfer.

In some embodiments, the method can further include (i) receiving information from which the load prediction curve for the load can be created, and (ii) training, using the information, the machine-learning model. The received information can include at least one of historical data describing power demand by a load, a load profile for a prior day, a load value of a profile used for designing a discharge plan, a real-time utility load, a time of day, or a calendar date.

In some examples, the method can further include (i) extracting features from historical data describing power demand by the load and (ii) training the machine-learning model with the extracted features.

In some examples, the method can further include (i) detecting outliers in historical data describing power demand by the load, (ii) modifying the historical data by discarding outlier data from the historical data, and (iii) training the machine-learning model with the modified historical data.

In some embodiments, the machine-learning model can be a time-series neural network.

In some examples, the identifying the specific time and the respective quantity of energy to transfer between the battery and the bus can be configured to perform at least one of peak shifting, peak shaving, or peak reducing.

In one embodiment, a system for controlling a battery can include at least one physical processor and physical memory that includes computer-executable instructions that, when executed by the at least one physical processor, cause the at least one physical processor to (i) create, using a machine-learning model, a load prediction curve for a load for a current day, (ii) analyze, to control peak energy use from an electric power source at a specific time, the load prediction curve to identify the specific time and a respective quantity of energy to transfer between a battery and a bus coupled between the electric power source and the load, and (iii) generate a battery controller input based on the identified respective quantity of energy to transfer.

In some examples, the above-described method may be encoded as computer-readable instructions on a non-transitory computer-readable medium. For example, a computer-readable medium may include one or more computer-executable instructions that, when executed by at least one processor of a computing device, may cause the computing device to (i) create, using a machine-learning model, a load prediction curve for a load for a current day, (ii) analyze, to control peak energy use from an electric power source at a specific time, the load prediction curve to identify the specific time and a respective quantity of energy to transfer between a battery and a bus coupled between the electric power source and the load, and (iii) generate a battery controller input based on the identified respective quantity of energy to transfer.

Features from any of the embodiments described herein may be used in combination with another embodiment in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings are presented to describe examples of the present teachings and are not limiting. Together with this following description, the drawings demonstrate and explain various principles of the present disclosure.

FIGS. 4A-H depict example graphs of load curves and respective state-of-charge curves.

Figure 1:
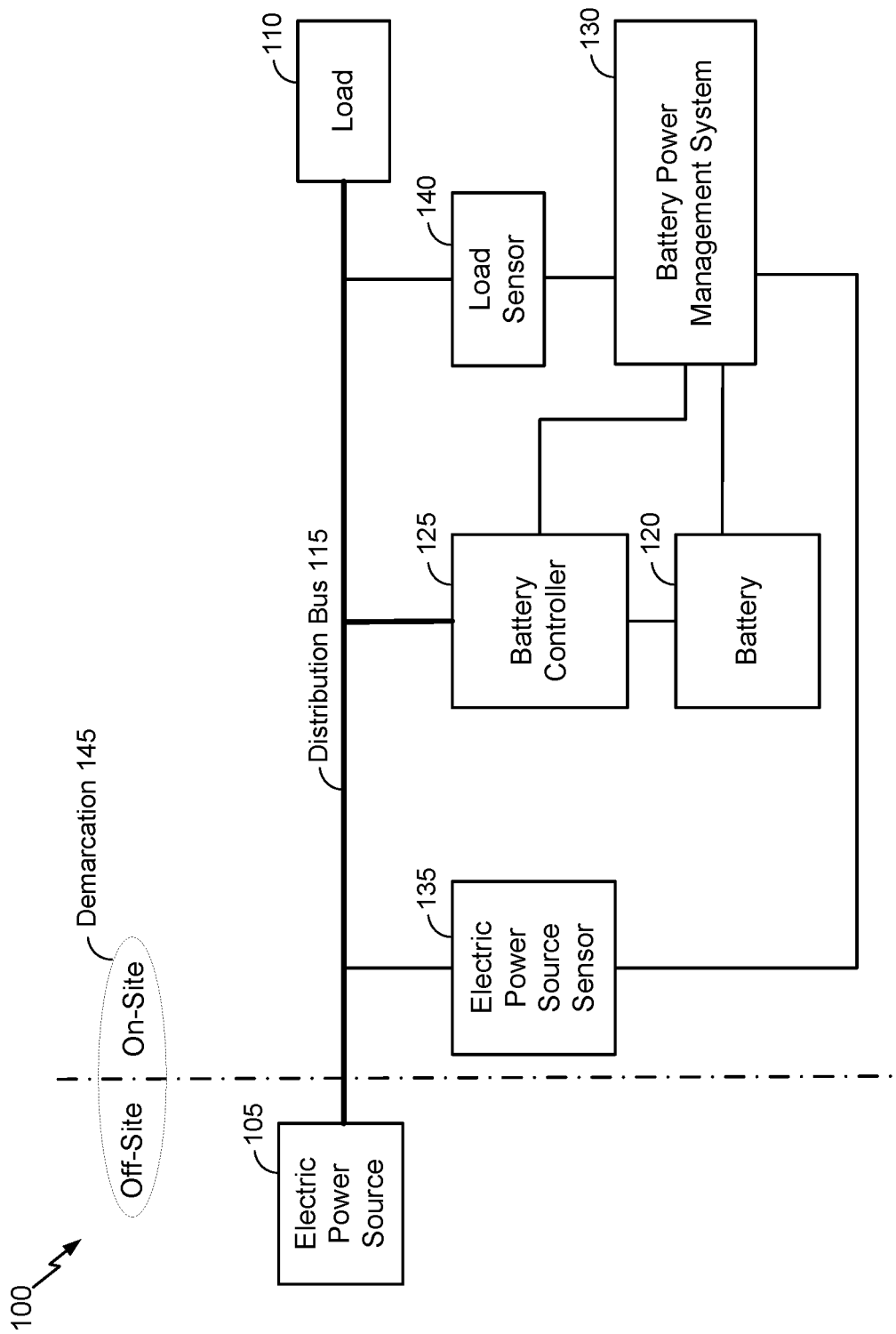
FIG. 1 depicts a block diagram of an example energy supply system suitable for implementing examples of the disclosed subject matter.

Each of the drawings is provided for illustration and description only and does not limit the present disclosure. In accordance with common practice, the features depicted by the drawings may not be drawn to scale. Accordingly, the dimensions of the depicted features may be arbitrarily expanded or reduced for clarity. In accordance with common practice, some of the drawings are simplified for clarity. Thus, the drawings may not depict all components of a particular apparatus or method. Further, like reference numerals denote like features throughout the specification and figures.

DETAILED DESCRIPTION

Provided are methods and apparatuses which control an energy supply system. The energy supply system can be configured to implement load management techniques such as peak shaving, peak shifting, peak reducing, or a combination thereof by using an energy storage system to supply electrical power during times of peak power demand by a load (e.g., a factory, a building, etc.). Implementing load management techniques can beneficially enable users to lower utility bills, reduce blackouts, reduce brownouts, implement efficient energy supply systems, and reduce emissions from peaking plants and backup generators.

In an example, provided is an energy supply system configured to implement load management techniques and having an energy storage system (e.g., a battery). Batteries can be effective in an energy storage system when other energy sources, such as diesel generators, are not cost-effective or not permitted. During times of peak power demand by a load, the energy storage system can be discharged to reduce peak usage charges and brownouts. During times of lower power demand by the load, the battery can be charged. Thus, load management techniques can alter power demand by the load, as seen by an electric power source (e.g., an electric power grid) over time.

A cost per kilowatt-hour (kWh) often limits a size of an energy storage system, which in turn limits both a time the energy storage system can supply power and a quantity of power provided thereby. Dividing a total useable capacity of the energy storage system by a length of time the energy storage system is to supply power often is not adequate to provide an economically feasible payback period. Further, some energy storage systems have finite energy storage and production capacities. Therefore, it is critical to intelligently control the supply of power from the energy storage systems to discharge the energy storage systems as much as possible to perform load management and to charge the energy storage systems when it is less expensive to do so.

Accordingly, provided are energy supply system control systems and methods that can perform functions such as machine-learning-based (i.e., intelligent) load predicting, machine-learning-based battery charge management, machine-learning-based battery discharge management, or a combination thereof. In some examples, a battery power management system (BPMS) can implement the provided techniques.

The examples disclosed hereby advantageously address the long-felt industry needs, as well as other previously unidentified needs, and mitigate shortcomings of conventional techniques. In some examples, systems and methods described herein can advantageously improve continuity of electric power service, reduce occurrences of brownouts, or a combination thereof. In some embodiments, systems and methods described herein can advantageously improve the functioning of devices configured to control an energy supply system. In some examples, systems and methods described herein can advantageously improve functioning of a battery power management computer by enabling the battery power management computer to more effectively perform load management techniques. In some examples, systems and methods described herein can advantageously reduce expenses charged by electric power providers to customers of the electric power providers. The provided techniques advantageously can, in non-limiting examples, reduce peak power demand seen by an electric power source by up to four times more on average than a standard constant discharge rate over concurrent periods. Further, provided is a stand-alone battery management system that meets functional safety requirements.

Numerous examples are disclosed in this application's text and drawings. Alternate examples can be devised without departing from the scope of this disclosure. Additionally, conventional elements of the current teachings may not be described in detail, or may be omitted, to avoid obscuring aspects of the current teachings.

The following list of abbreviations, acronyms, and terms is provided to assist in comprehending the current disclosure and are not provided as limitations.

BPMS—Battery Power Management System
kW—Kilowatt
kWh—Kilowatt-hour
MW—Megawatt
MWh—Megawatt-hour
Peak Reducing—A load management technique that reduces
   a quantity of electric power demanded by a load at a time
   of peak demand for electric power.
Peak Shaving—A load management technique that reduces
   an amount of electric
   power supplied by an electric power source during a time
     of peak demand. For
   example, peak shaving techniques can reduce a monthly
     peak load average for
   any fifteen-minute interval during a month.
Peak Shifting—A load management technique that changes
   a time at which a peak
   demand for electric power occurs. For example, peak
     shifting techniques can
   charge a battery during off-peak hours and discharge the
     battery during peak
   and near-peak hours.
SOC—State of Charge This description provides, with reference to FIGS. 1 and 2, detailed descriptions of example apparatus for controlling an energy supply system. Detailed descriptions of an example method are provided in connection with FIGS. 3 and 4.

FIG. 1 depicts a block diagram of an example energy supply system 100 suitable for implementing examples of the disclosed subject matter. For example, at least a portion of the energy supply system 100 can be configured to control at least a portion of an energy supply system.

In some examples, the energy supply system 100 can include an electric power source 105, a load 110, a distribution bus 115, an energy storage device such as a battery 120, a battery charge controller 125, a Battery Power Management System (BPMS) 130, an electric power source sensor 135, a load sensor, the like, or a combination thereof. These devices are described in further detail herein.

In examples, the electric power source 105 can be a source of electric power such as a generator, an electric power distribution system, an electric power grid, a substation, the like, or a combination thereof. The electric power source 105 can be, but need not be, located remotely from the load 110. In some examples, an electric power utility can provide the electric power source 105. The electric power source 105 can be configured to supply electric power to the load 110, the battery 120, or both.

In examples, the load 110 can be an electrical load that is coupled to the electric power source 105. In a non-limiting example, the load 110 can be a building. In a non-limiting example, the load 110 can be a factory, electrical equipment that is a part of the factory, or a combination thereof. In a non-limiting example, the load 110 can be an electrical load that is not a part of an electric vehicle drivetrain. In a non-limiting example, the load 110 can be stationary. In a non-limiting example, the load 110 can be resistive, inductive, or a combination thereof.

In examples, the distribution bus 115 can couple the electric power source 105, the load 110 and the battery charge controller 125 to each other to enable flow of electric current (e.g., alternating current, direct current, or both) between these coupled devices. In some examples, conditions of the distribution bus 115 can be detected using sensors such as the electric power source sensor 135, the load sensor, 140, the like, or a combination thereof.

A battery 120 can be a device including electrochemical cells that store energy. The battery 120 is capable of being both charged and discharged at different times, thus enabling storing energy from the electric power source 105 at one time and transferring, at a later time, the stored energy to either the electric power source 105, the load 110, or both.

In some examples, the battery 120 can be a lead carbon battery, a lithium-ion battery, a lead acid battery, the like, or a combination thereof.

The battery 120 may be monitored with a battery sensor to measure electrical power stored in at least one cell of the battery 120 (e.g., a state of charge of the battery 120), a voltage (e.g., DC voltage) of at least one cell in the battery 120, the like, or a combination thereof. In some non-limiting examples, the battery sensor can transfer information describing at least one measurement to the BPMS 130.

The battery charge controller 125 can be configured to control charging and discharging of the battery 120. The battery charge controller 125 can also be configured to control a rate of power flow to and from the battery 120. The BPMS 130 can be configured to control the battery charge controller 125.

In some examples, the battery charge controller 125 can include an inverter to convert direct current (DC) from the battery 120 to alternating current (AC) that is compatible with the distribution bus 115. In some embodiment, the battery charge controller 125 can include a rectifier to convert alternating current (AC) from the distribution bus 115 to direct current (DC) that is compatible with the battery 120.

In some examples, an energy storage device coupled to a device configured to control energy into and out of the energy storage device can be used with the provided systems and methods. Example energy storage devices include, and are not limited to, ultracapacitors, pumped-hydro energy storage, battery storage, the like, or a combination thereof. In some embodiments, energy storage devices in addition to batteries (or other than batteries) can be used in place of the battery 120 to store energy. In these examples, the battery charge controller 125 can be replaced with a different device configured to convert energy stored in the energy storage device to an electrical form compatible with the distribution bus 125. In these examples, the battery charge controller 125 can be a device configured to control a flow of power to the energy storage device, from the energy storage device, or a combination thereof.

The Battery Power Management System (BPMS) 130 can be a hardware-implemented processing unit configured to monitor at least a portion of operation of the energy supply system 100, to control at least a portion of operation of the energy supply system 100, or both. The BPMS 130 can be a device that is configured to control charging of the battery 120, discharging of the battery 120, or both. In some examples, the BPMS 130 can initiate performing at least a portion of a method described hereby, perform at least a portion of a method described hereby, or both. In some embodiments, computing devices other than the BPMS 130 can initiate performing at least a portion of a method described hereby, perform at least a portion of a method described hereby, or both.

In some examples, the BPMS 130 can be configured to receive information from the battery charge controller 125, the electric power source sensor 135, the load sensor 140, other sensor devices, a server, the like, or a combination thereof.

The BPMS 130 can provide, to a user, indications of a status of the distribution bus 115, the battery 120, the battery charge controller 125, a sensor, the like, or a combination thereof. In examples, the BPMS 130 can provide, to a user, a history of received information describing the status of the distribution bus 115, the battery 120, the battery charge controller 125, a sensor, the like, or a combination thereof. We now turn to FIG. 2.

Figure 2:
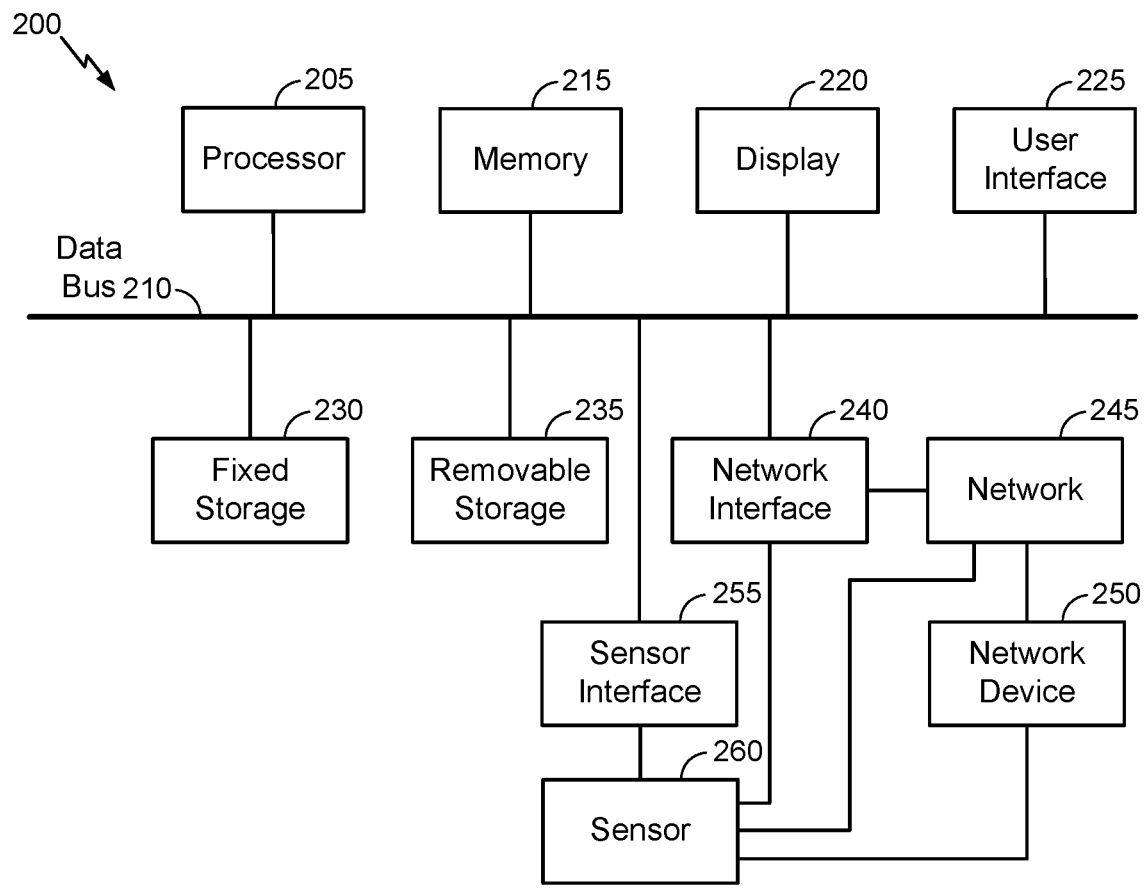
FIG. 2 depicts a block diagram of an example device suitable for implementing examples of the disclosed subject matter.

FIG. 2 depicts an example of an apparatus suitable for use as the BPMS 130. In some examples, the BPMS 130 can be implemented with at least a portion of: a microprocessor, a microcontroller, a digital signal processor (DSP) integrated circuit, a field programmable gate array (FPGA), a programmable logic device (PLD), an application-specific integrated circuit (ASIC), a controller, a state machine, a gated logic circuit, a discrete hardware component, a dedicated hardware finite state machine, a suitable physical device configured to manipulate information (e.g., calculating, logical operations, the like, or a combination thereof), the like, or a combination thereof. We now return to FIG. 1.

In some examples, the utility load sensor 135 can measure cumulative electrical power (e.g., in kWh, in MWh) transferred through a point of the distribution bus 115, electric power (e.g., in kW, in MW) transferred through a point of the distribution bus 115, a voltage (e.g., AC voltage) at a point of the distribution bus 115, current flow past a point of the distribution bus 115, the like, or a combination thereof. In some non-limiting examples, the utility load sensor 135 can transfer information describing at least one measurement to the BPMS 130.

In some examples, the site load sensor 140 can measure cumulative electrical power (e.g., in kWh, in MWh) transferred through a point of the distribution bus 115, electric power (e.g., in kW, in MW) transferred through a point of the distribution bus 115, a voltage (e.g., AC voltage) at a point of the distribution bus 115, current flow past a point of the distribution bus 115, the like, or a combination thereof. In some non-limiting examples, the site load sensor 140 can transfer information describing at least one measurement to the BPMS 130.

The utility load sensor 135 and the site load sensor 140 can differ in that the utility load sensor 135 and the site load sensor 140 sense at different points of the distribution bus 115.

In a non-limiting example, portions of the energy supply system 100 can be physically located at a distance from the load 110. A line of demarcation can separate off-site devices (e.g., the electric power source 105) from on-site devices (e.g., the load 110). In some examples, at least a portion of the battery 120 may be located on-site. In some examples, at least a portion of the battery 120 may be located off-site. In some examples, at least a portion of the BPMS 130 may be located on-site. In some examples, at least a portion of the BPMS 130 may be located off-site.

FIG. 2 illustrates an example computing device 200 suitable for implementing examples of the disclosed subject matter. For example, at least a portion of the energy supply system 100 can be configured to control at least a portion of an energy supply system. In examples, aspects of the computing device 200 can be implemented at least in part in a desktop computer, a laptop computer, a server, a mobile device, a special-purpose computer, a non-generic computer, an electronic device described hereby (as is practicable), the like, or a combination thereof. In some examples, the disclosed subject matter can be implemented in, and used with, hardware devices, computer network devices, the like, or a combination thereof. The configuration depicted in FIG. 2 is an illustrative example and is not limiting.

In some examples, the computing device 200 can include a processor 205, a data bus 210, a memory 215, a display 220, a user interface 225, a fixed storage device 230, a removable storage device 235, a network interface 240, a network 245, a network device 250, a sensor interface 255, a sensor 260, the like, or a combination thereof. These elements are described in further detail herein.

The processor 205 can be a hardware-implemented processing unit configured to control at least a portion of operation of the computing device 200. The processor 205 can perform logical and arithmetic operations based on processor-executable instructions stored within the memory 215. The processor 205 can be configured to execute instructions which cause the processor 205 to initiate at least a part of a method described hereby. In an example, the processor 205 can interpret instructions stored in the memory 215 to initiate at least a part of a method described hereby. In an example, the processor 205 can execute instructions stored in the memory 215 to initiate at least a part of a method described hereby. The instructions, when executed by the processor 205, can transform the processor 205 into a special-purpose processor that causes the processor to perform at least a part of a function described hereby. The processor 205 may also be referred to as a central processing unit (CPU), a special-purpose processor (e.g., a non-generic processor), or both.

The processor 205 can comprise or be a component of a physical processing system implemented with one or more processors. In some examples, the processor 205 can be implemented with at least a portion of: a microprocessor, a microcontroller, a digital signal processor (DSP) integrated circuit, a field programmable gate array (FPGA), a programmable logic device (PLD), an application-specific integrated circuit (ASIC), a controller, a state machine, a gated logic circuit, a discrete hardware component, a dedicated hardware finite state machine, a suitable physical device configured to manipulate information (e.g., calculating, logical operations, the like, or a combination thereof), the like, or a combination thereof.

The data bus 210 can couple components of the computing device 200. The data bus 210 can enable information communication between the processor 205 and one or more components coupled to the processor 205. In some examples, the data bus 210 can include a data bus, a power bus, a control signal bus, a status signal bus, the like, or a combination thereof. In an example, the components of the computing device 200 can be coupled together to communicate with each other using a different suitable mechanism.

The memory 215 generally represents any type or form of volatile storage device, non-volatile storage device, medium, the like, or a combination thereof. The memory 215 can store data, processor-readable instructions, the like, or a combination thereof. In an example, the memory 215 can store data, load data, maintain data, or a combination thereof. In an example, the memory 215 can store processor-readable instructions, load processor-readable instructions, maintain processor-readable instructions, or a combination thereof. In some embodiments, the memory 215 can store computer-readable instructions configured to cause a processor (e.g., the processor 205) to initiate performing at least a portion of a method described hereby. The memory 215 can be a main memory configured to store an operating system, an application program, the like, or a combination thereof. The memory 215 can be configured to store a basic input-output system (BIOS) which can control basic hardware operation such as interaction of the processor 205 with peripheral components. The memory 215 can also include a non-transitory machine-readable medium configured to store software. Software can mean any type of instructions, whether referred to as at least one of software, firmware, middleware, microcode, hardware description language, the like, or a combination thereof. Processor-readable instructions can include code (e.g., in source code format, in binary code format, executable code format, or in any other suitable code format).

The memory 215 can include at least one of read-only memory (ROM), random access memory (RAM), a flash memory, a cache memory, an erasable programmable read-only memory (EPROM), an electrically erasable programmable read-only memory (EEPROM), a register, a hard disk drive (HDD), a solid-state drive (SSD), an optical disk drive, other memory, the like, or a combination thereof which is configured to store information (e.g., data, processor-readable instructions, software, the like, or a combination thereof) and is configured to provide the information to the processor 205.

The display 220 can include a component configured to visually convey information to a user of the computing device 200. In examples, the display 220 is a video display screen, such as a light-emitting diode (LED) screen.

The user interface 225 can include user devices such as a switch, a keypad, a touch screen, a microphone, a speaker, an audio reproduction device, a jack for coupling the computing device to an audio reproduction device, the like, or a combination thereof. The user interface 225 can optionally include a user interface controller. The user interface 225 can include a component configured to convey information to a user of the computing device 200, a component configured to receive information from the user of the computing device 200, or both.

The fixed storage device 230 can include one or more hard drive, flash storage device, the like, or a combination thereof. The fixed storage device 230 can be an information storage device which is not configured to be removed during use. The fixed storage device 230 can optionally include a fixed storage device controller. The fixed storage device 230 can be integral with the computing device 200 or can be separate and accessed through an interface.

The removable storage device 235 can be integral with the computing device 200 or can be separate and accessed through other interfaces. The removable storage device 235 can be an information storage device which is configured to be removed during use, such as a memory card, a jump drive, a flash storage device, an optical disk, the like, or a combination thereof. The removable storage device 235 can optionally include a removable storage device controller.

The removable storage device 235 can be integral with the computing device 200 or can be separate and accessed through an interface.

In examples, a computer-readable storage medium such as one or more of the memory 215, the fixed storage device 230, the removable storage device 235, a remote storage location, the like, or a combination thereof can store non-transitory computer-executable instructions configured to cause a processor (e.g., the processor 205) to implement at least an aspect of the present disclosure.

The network interface 240 can couple the processor 205 (e.g., via the data bus 210) to the network 245 and enable exchanging information between the processor 205 and the network 245. In some examples, the network interface 240 can couple the processor 205 (e.g., via the data bus 210) to the network 245 and enable exchanging information between the processor 205 and the sensor 260. For example, the network interface 240 can enable the processor 205 to communicate with one or more other network devices 250. The network interface 240 can couple to the network 245 using any suitable technique and any suitable protocol. In some examples, the network interface 240 can include a data bus, a power bus, a control signal bus, a status signal bus, the like, or a combination thereof. Example techniques and protocols the network interface 240 can be configured to implement include digital cellular telephone, WiFi™, Bluetooth®, near-field communications (NFC), the like, or a combination thereof.

The network 245 can couple the processor 205 to one or more other network devices. In some examples, the network 245 can enable exchange of information between the processor 205 and the one or more other network devices 250. In some examples, the network 245 can enable exchange of information between the processor 205 and the sensor 260. The network 245 can include one or more private networks, local networks, wide-area networks, the Internet, other communication networks, the like, or a combination thereof. In some examples, the network 245 can be a wired network, a wireless network, an optical network, the like, or a combination thereof.

In some embodiments, the network device 250 can store computer-readable instructions configured to cause a processor (e.g., the processor 205) to initiate performing at least a portion of a method described hereby. In an example, the one or more other network devices 250 can store non-transitory computer-executable instructions configured to cause a processor (e.g., the processor 205) to implement at least an aspect of the present disclosure. The non-transitory computer-executable instructions can be received by the processor 205 and implemented using at least a portion of techniques described hereby. In another example, information described hereby can be stored in the fixed storage device 230, the removable storage device 235, the network device 250, the like, or a combination thereof.

The network device 250 can include the sensor 260, a hardware device configured to couple the network 245 to the sensor 260, a server, a digital information storage device, the like, or a combination thereof.

In some examples, the network device 250 can include user devices such as a switch, a keypad, a touch screen, a microphone, a speaker, an audio reproduction device, a jack for coupling the computing device to an audio reproduction device, the like, or a combination thereof. The network device 250 can optionally include a user interface controller. The network device 250 can include a component configured to convey information to a user of the computing device 200, a component configured to receive information from the user of the computing device 200, or both.

In some examples, all the components illustrated in FIG. 2 need not be present to practice the present disclosure. Further, the components can be coupled in different ways from those illustrated.

The sensor interface 255 can couple the processor 205 (e.g., via the data bus 210) to the sensor 260. In some examples, the sensor interface 255 can couple the processor 205 (e.g., via the data bus 210) to the sensor 260 and enable exchanging information between the processor 205 and the sensor 260. For example, the sensor interface 255 can enable the processor 205 to receive, from the sensor 260, analog information and/or digital information describing at least one state of at least one electrical energy supply system condition, at least one electrical energy distribution system condition, at least one electrical energy generation system condition, the like, or a combination thereof. The sensor interface 255 can couple to the sensor 260 using any suitable technique and any suitable protocol. In some examples, the sensor interface 255 can perform analog-to-digital conversion, digital-to-analog conversion, or a combination thereof. In some examples, the sensor interface 255 can include a data bus, a power bus, a control signal bus, a status signal bus, the like, or a combination thereof. Example techniques and protocols the sensor interface 255 can be configured to implement include digital cellular telephone, WiFi™, Bluetooth®, near-field communications (NFC), the like, or a combination thereof.

The sensor 260 can sense at least one state of at least one electrical energy supply system condition, at least one electrical energy distribution system condition, at least one electrical energy generation system condition, the like, or a combination thereof. In examples, the sensor 260 can produce an analog output indicating the at least one state, a digital output indicating the at least one state, or both. The sensor 260 can produce an output of the at least one state using any suitable technique, any suitable protocol, or both. In some examples, the sensor 260 can perform analog-to-digital conversion, digital-to-analog conversion, or a combination thereof. In some examples, the sensor 260 can include a data bus, a power bus, a control signal bus, a status signal bus, the like, or a combination thereof. Example techniques and protocols the sensor 260 can be configured to implement include digital cellular telephone, WiFi™, Bluetooth®, near-field communications (NFC), the like, or a combination thereof.

Some of the states the sensor 260 can sense include a rate of electrical energy flow (e.g., power in kW, power in MW), a line voltage, a battery voltage, a line current, a battery current, a battery cell voltage, a battery cell temperature, a battery cell impedance, a battery state of charge (SOC) (e.g., in kWh, in MWh), the like, or a combination thereof. In some examples, some of the states the sensor 260 can sense include a status of a breaker (e.g., open, shut, or tripped), a status of a disconnect (e.g., open or shut), a status of an electrical power generator, the like, or a combination thereof.

Figure 3:
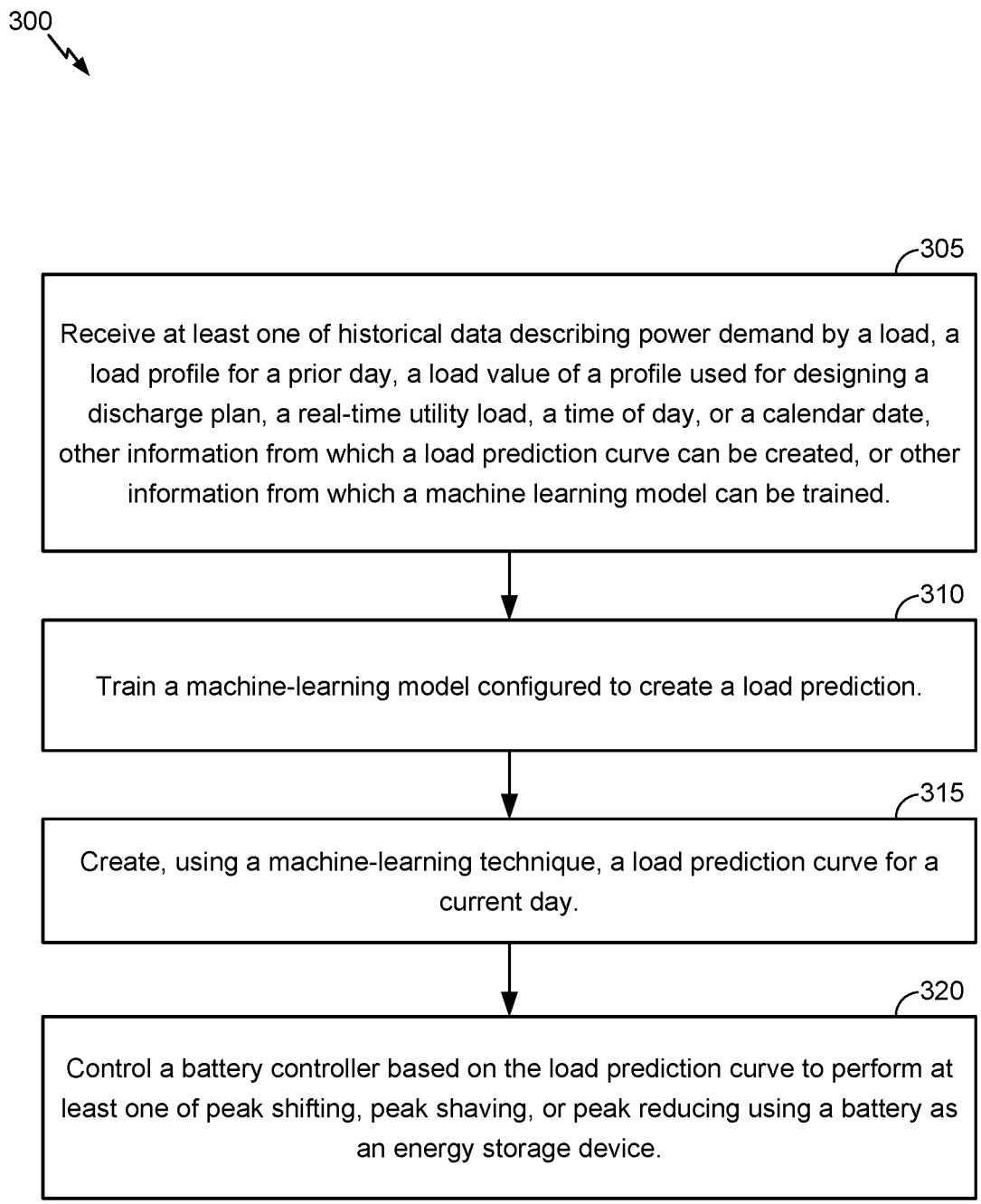
FIG. 3 depicts an example method for controlling an energy supply system.
Figure 4A:
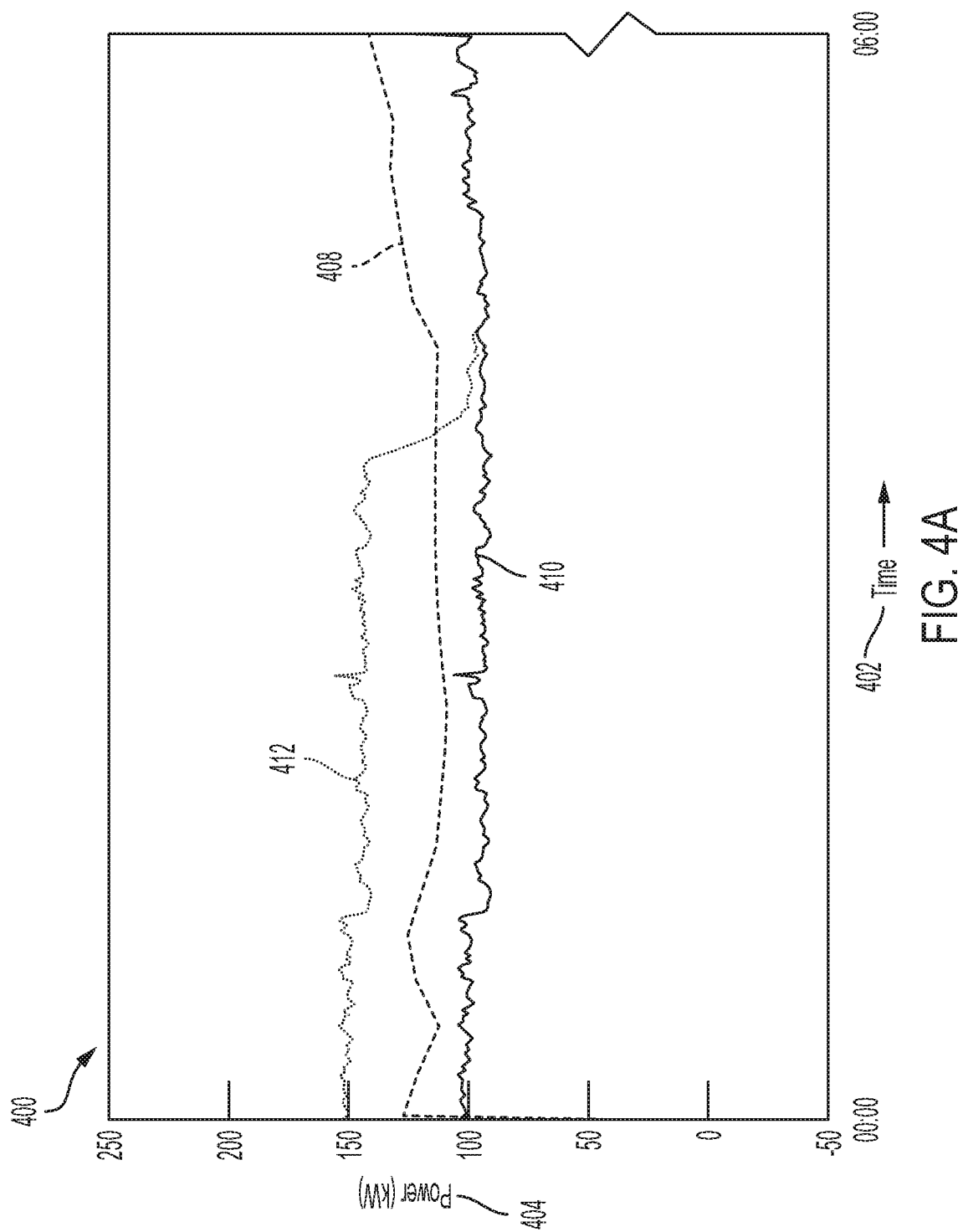
Figure 4D:
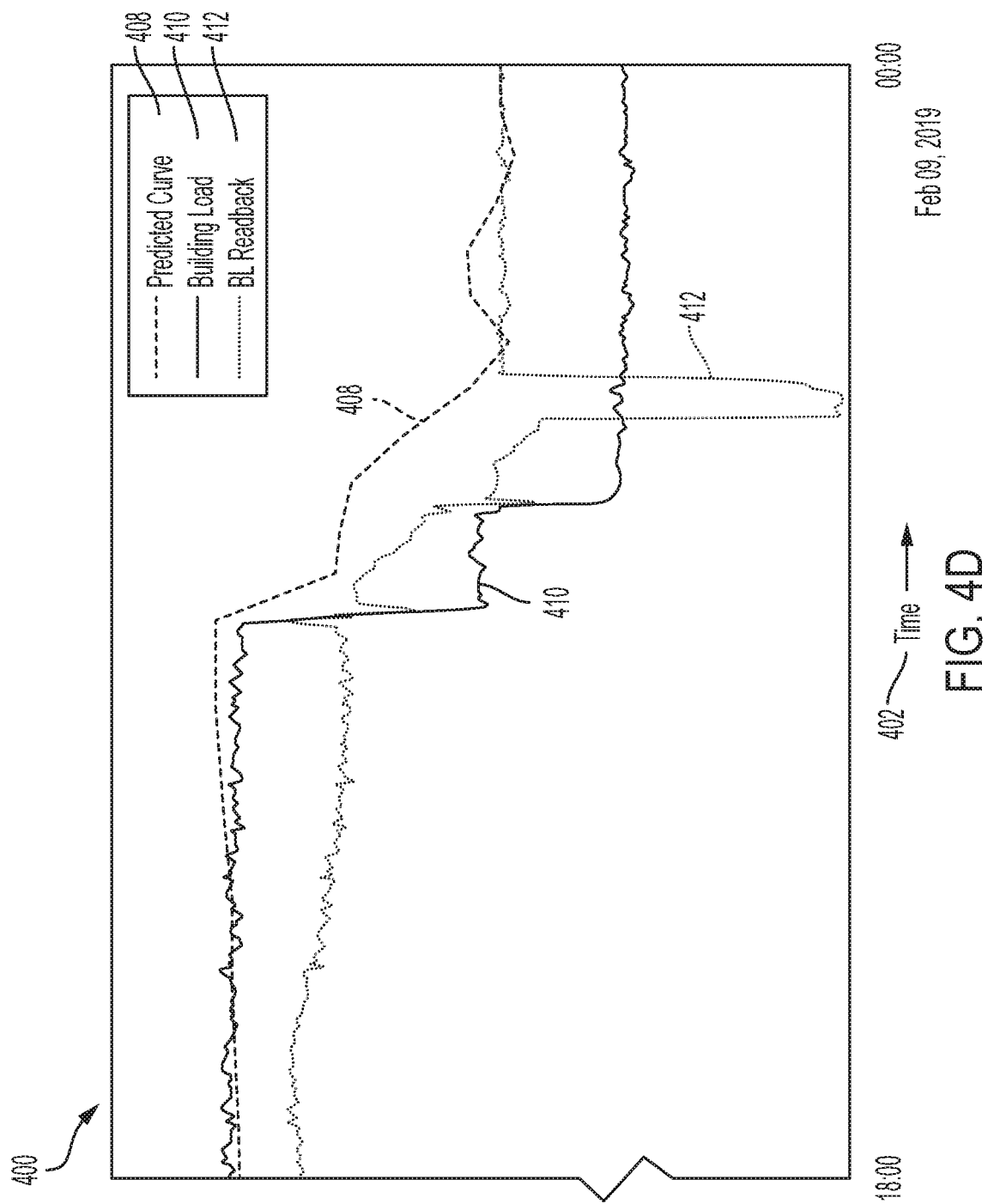
Figure 4E:
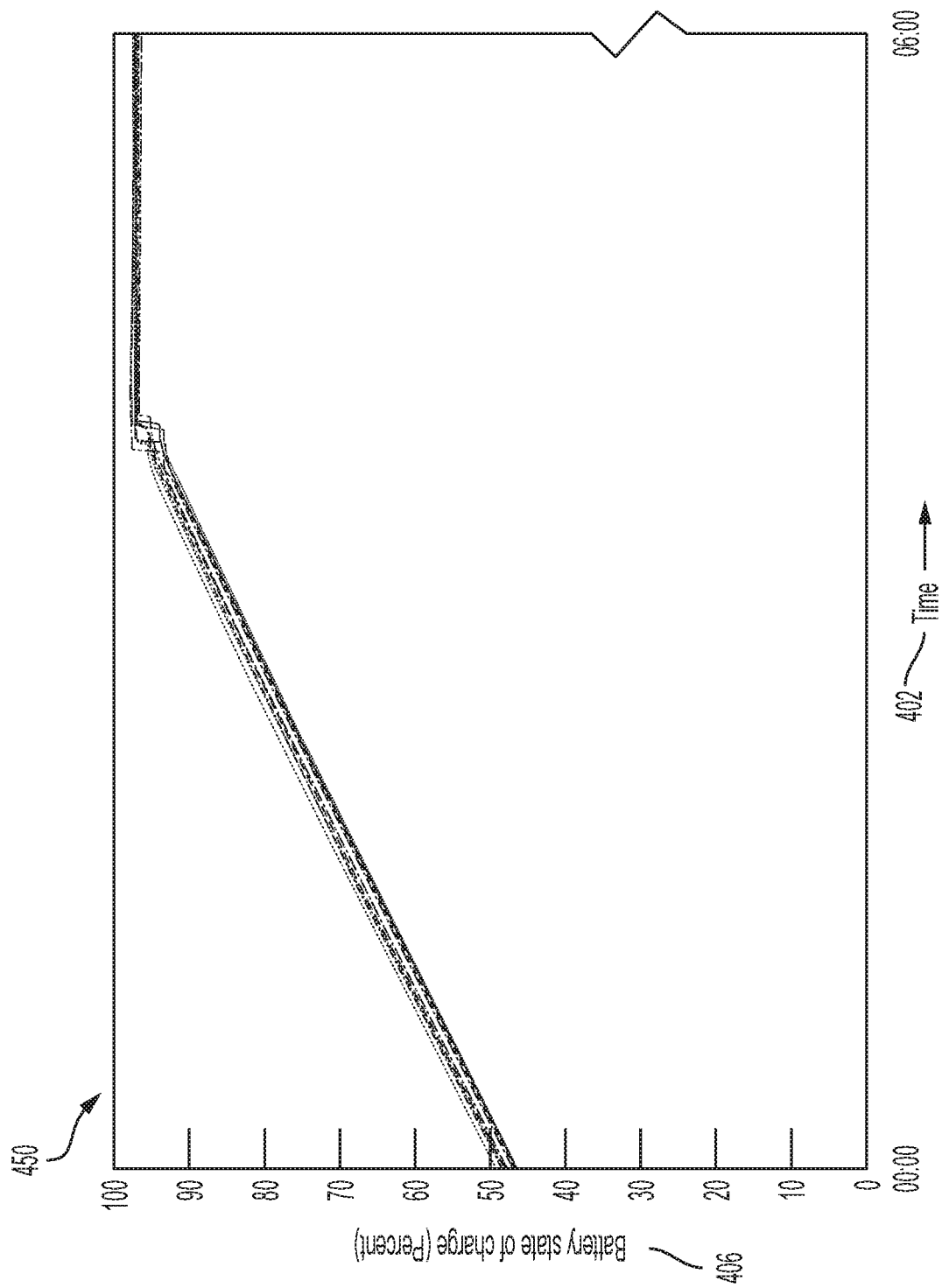
Figure 4G:
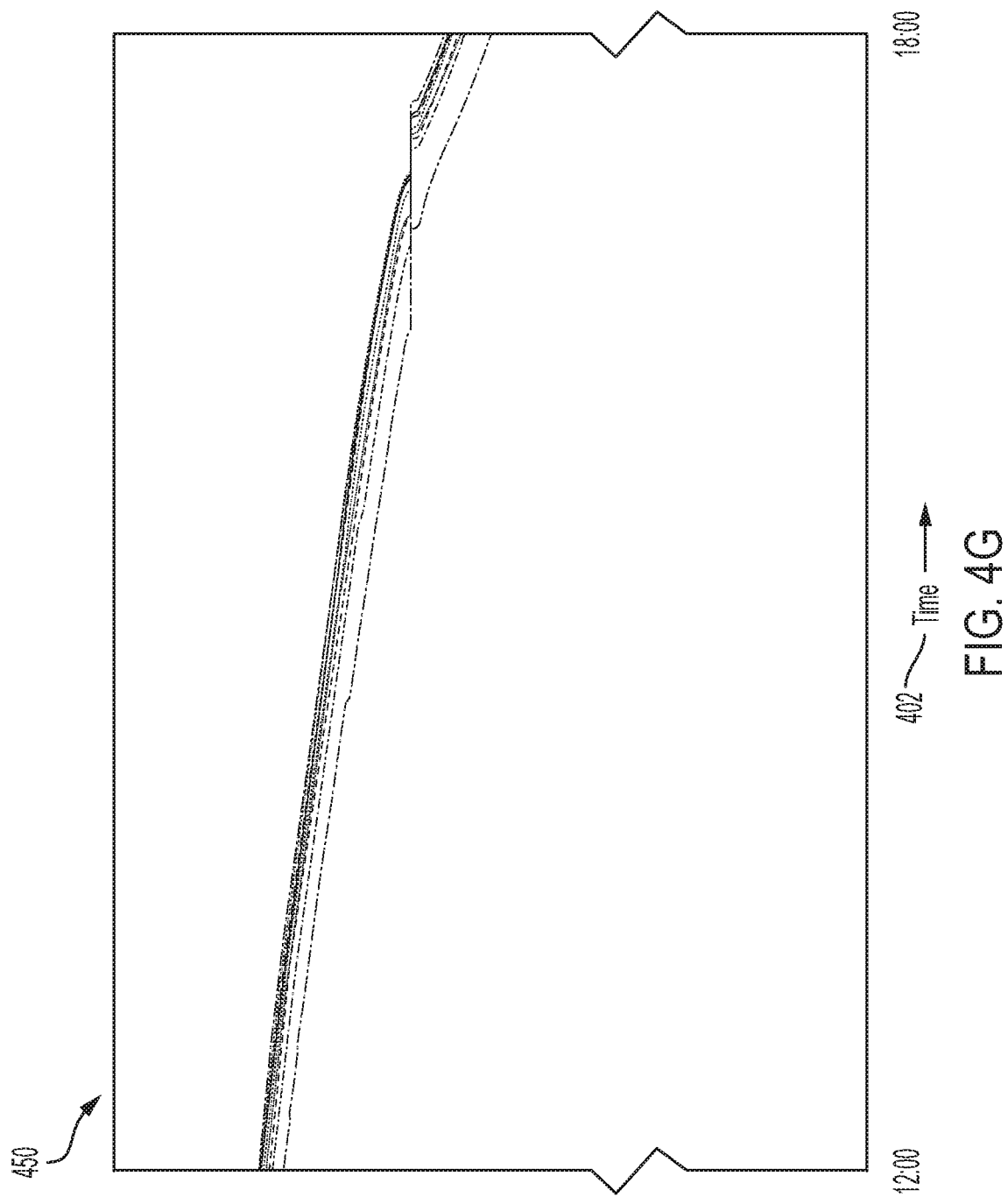
Figure 4H:
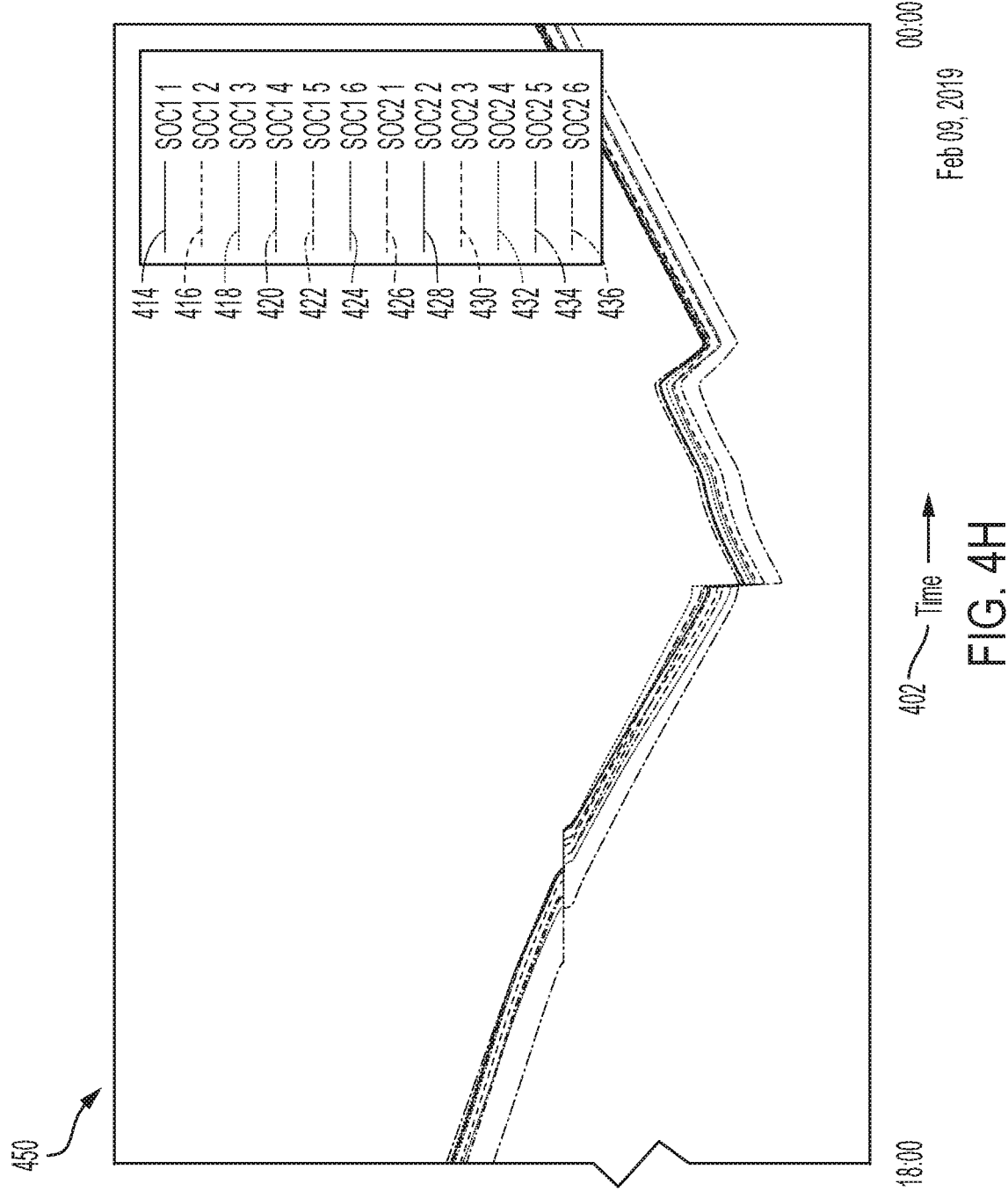

FIG. 3 depicts an example method 300 for controlling an energy supply system. The method 300 can be performed by the apparatus described hereby, such as the energy supply system 100 in FIG. 1, the computing device 200 in FIG. 2, or a practicable combination thereof.

As illustrated in FIG. 3, at block 305, one or more of the devices described herein can receive at least one of historical data describing power demand by a load, a load profile for a prior day, a load value of a profile used for designing a discharge plan, a real-time utility load, a time of day, a calendar date, other information from which a load prediction curve can be created, or other information from which a machine learning model can be trained.

As illustrated in FIG. 3, at block 310, one or more of the devices described herein can train a machine-learning model configured to create a load prediction. In examples, block 310 is optional.

As illustrated in FIG. 3, at block 315, one or more of the devices described herein can create, using a machine-learning technique, a load prediction curve for a current day.

As illustrated in FIG. 3, at block 320, one or more of the devices described herein can control a battery controller based on the load prediction curve to perform at least one of peak shifting, peak shaving, or peak reducing using a battery as an energy storage device.

The blocks in FIG. 3 are not limiting of the examples. In some examples, the blocks can be combined, the order can be rearranged, or both, as practicable.

FIGS. 4A-H depict a non-limiting empirical example graph of load curves 400 and battery state of charge curves 450 relating to implementing an embodiment of the energy supply system 100. The example in FIG. 4 is not limiting. Features of FIGS. 4A-H are described in further detail herein.

In FIGS. 4A-4D, the load curves 400 have an x-axis of time 402 over a 24-hour period and a y-axis of power 404 in kilowatts. The load curves 400 depict a predicted load curve 408 made at the onset of the 24-hour period, a building load curve 410, and a combined building load readback curve 412 that combines both the building load curve 410, power transferred to a battery, and power transferred from the battery. In a non-limiting example, the load curves 400 can be for a non-vehicular load other than a building.

In FIGS. 4E-4H, the battery state of charge (SOC) curves 450 have the x-axis of time 402 over the same 24-hour period as the load curves 400, as well as a y-axis indicating battery state of charge 406 in percent. The battery SOC curves 450 depict respective SOCs (lines 414 to 436) for twelve cells (e.g., two banks of six cells each) in a battery over the 24-hour period. Referring to the battery SOC curves 450, when the battery SOC curves 450 are increasing over time, the battery is charging, when the battery curves 450 are decreasing over time, the battery is discharging, and when the battery SOC curves 450 are substantially flat over time, the battery is neither substantially charging nor substantially discharging. These state-of-charge curves and this battery arrangement are non-limiting examples.

Load predicting processes can provide an expected power requirement of a load (i.e., a load level) at a future time, within a certain level of confidence. In examples, load predicting processes can produce a predicted load curve, a non-limiting example of which is depicted in FIGS. 4A-D. Load predictions can be based on information describing factors such as historical load power demand, real-time load power demand, calendar date, day of the week, time of the day, the like, or a combination thereof. In some examples, load predicting may also be known as load forecasting.

A BPMS (e.g., the BPMS 130) can perform load predicting, such as to optimize performance of battery systems, perform load shifting, perform peak shaving, the like, or a combination thereof.

The BPMS can make generalized load predictions to compensate for inherent non-linearities of customer loads. In some examples, load predictions can be made once daily, such as at 12:01 AM.

In some examples, the BPMS can implement machine-learning techniques to collect information over time create customer load profiles based on particularities of the load. The BPMS can thus produce load forecasts with increased accuracy over time, as the BPMS collects more information. As loads change, the BPMS can learn and adapt over time without user intervention. In some examples, information stored in an information storage device of the BPMS can be transferred to another BPMS (or other type of computing device) and thus negate a need for another learning cycle.

In some examples, the BPMS can use a time-series neural network to perform time-series analysis and thus produce a load prediction. Thus, the BPMS can perform functions such as training the neural network and generating a load prediction. In some examples, the neural network can be a Convolutional Neural Network (CNN). In some embodiments, the neural network can be a Long Short-Term Memory (LSTM).

As used herein, the acronym "CNN" refers to a Convolutional Neural Network. A CNN is a type of feed-forward neural network which can process and collect portions of input information. Thus, the CNN can receive input data and provide a prediction (i.e. a forecast) having a high level of probability.

As used herein, the acronym "LSTM" refers to a Long Short-Term Memory neural network. An LSTM is a type of recurrent feed-forward neural network architecture which can be trained to classify input data. An LSTM is trained on a training data set, such as a training data set having known-accurate information. Thus, the LSTM can receive input data and provide a prediction (i.e. a forecast) having a high level of probability. The LSTM includes intermediate hidden layers of processing units which perform a function on data input from a preceding layer. The output from a hidden layer is a "hidden state." The hidden state is "hidden" in the sense that the hidden state is not an output from an output layer.

For each day of a given month, the BPMS can derive a predicted load profile based on loads measured on prior days of the same type (weekday or weekend). For example, historic load data from a past Monday can be used as an input to derive a predicted load profile for a subsequent Monday.

Over the course of a day, the BPMS can recalculate the load profile prediction for the remainder of the day based on a real-time load (e.g., as measured by the load sensor 140) and can recalculate an optimal rate of discharge for later points of time in the day. These techniques can account for factors such as weather, a higher than expected load, the like, or a combination thereof.

Inputs to BPMS algorithms can include at least one of (i) a load profiles of a prior day (e.g., differentiated as most recent in-use days and non-use days), (ii) a load value of a profile used for creating a discharge plan (e.g., in fifteen-minute intervals) (e.g., in kW), (iii) a real-time utility load (e.g., in one-minute intervals) (e.g., in kW), (iv) a time of day (e.g., in one-minute resolution), (iv) a month, or (v) a day of the month.

In examples, feature engineering and outlier detection can be used to increase accuracy of predicted load curves.

In some examples, the BPMS can receive historic load information (e.g., describing the past one to eight weeks of load information) and can extract useful features from the historic load information with which to train the neural network. The BPMS can train weights and biases of the neural network of the BPMS substantially continuously. For a present day, the BPMS can use the neural network to calculate a prediction of load for that day. For example, the BPMS calculates the predicted load curve 408 in FIGS. 4A-4D. The BPMS can also update weights and biases of the neural network with real-time load information (e.g., from the load sensor 140, the electric power source sensor 135, the battery controller 125, or a combination thereof). Accordingly, as long-term changes in the load occur (e.g., due to changes in seasons), the BPMS can update weights and biases of the neural network to adapt to these changes. Also, as long-term changes in the load occur (e.g., due to changes in seasons), the BPMS can update weights and biases of the neural network to discard values of the weights and biases of the neural network that do not conform with these changes in load.

In some examples, the BPMS can also perform outlier detection on the historic load information to identify anomalies in the historic load information that might skew the predicted load curves. The BPMS can then mitigate effects of outliers on the predicted load curves. In an example, the BPMS can use a first-in first-out table of historic load information. Thus, as new historic load information is loaded into the table, the oldest load information can be removed from the table. The BPMS can process the historic load information (e.g., from the table) with an outlier detecting algorithm that can categorize (i.e., bucket) the historic load information based on statistical similarities represented by the historic load information. This technique can group together historic load information from like days to increase accuracy of the predicted load curves. In some examples, like days have similar historic load information.

For example, on a day (e.g., Monday at 12:01 AM), the BPMS can look at historic load information for the immediately prior day (e.g., Sunday) and compare the historic load information for the immediately prior day to historic load information for prior days of the same name (e.g., prior Sundays). The comparison can include determining an average of the historic load information for prior days of the same name (e.g., the prior eight Sundays, e.g., not including the immediately prior Sunday) and comparing the historic load information for the immediately prior day to a first standard deviation of the average historic load information for prior days of the same name to determine a quantity of energy represented by the difference. The quantity of energy can be compared to a threshold value to identify if the quantity of energy represented by the difference is sufficient to qualify as an outlier. If the quantity of energy is greater than the threshold value, then the quantity of energy represented by the difference is an outlier. If the quantity of energy is less than the threshold value, then the quantity of energy represented by the difference is not an outlier. In some examples, outlier data can be discarded as being not sufficiently useful to train the neural network, not sufficiently useful to make an accurate load prediction, or both. In some examples, load deviations greater than one standard deviation from the historic average can be caused by one-time events such as emergency loading, a store being closed for a holiday, etc. Thus, performing outlier detection can increase accuracy of outputs of the neural network and load predictions.

Portions of historic load information for the immediately prior day that are within one standard deviation of the average historic load information for prior days of the same name can be stored as a part of the historic load information for prior days of the same name. Portions of historic load information for the immediately prior day that are within one standard deviation of the average historic load information for prior days of the same name can be used to train the neural network (e.g., for days of the same name) (e.g., for a day following a day of the same name).

In some examples, the BPMS algorithm can be configured to prevent overtraining. Overtraining can occur under some circumstances when a predicted load is too highly correlated to historic load information. In some embodiments, overtraining can be mitigated by subtracting historic load information for an immediately prior day from an average of historic load information for prior days of the same name to identify a difference. The difference can be compared to standard deviations of the historic load information to identify a level of correlation of the historic load information for the immediately prior day. The level of correlation can be compared to a threshold value to identify if the level of correlation is too great. If the level of correlation is less than the threshold value, then the level of correlation is too great. If the level of correlation is greater than the threshold value, then the level of correlation is acceptably lower. In some examples, historic load information for an immediately prior day can be discarded as being too highly correlated to train the neural network, not sufficiently useful to make an accurate load prediction, or both.

In some examples, the BPMS can perform feature extraction on historical load information from the prior six days (e.g., the past Tuesday through past Sunday when load is being predicted for present day Monday) and train the neural network on the resultant historic load information to predict the prior day (e.g., Sunday). Then, the BPMS can use the neural network to generate a neural network-predicted load for the present day (e.g., Monday). The BPMS can compare the neural network-predicted load for the present day to historic load information for the days having the same name as the present day (e.g., historic load information for prior Mondays) to determine a difference between the network-predicted load for the present day and an average of historic load information for the days having the same name as the present day. The difference can then be added to the average of historic load information for the days having the same name as the present day to produce a load profile for the present day.

In some examples, noise and other errors can be present in the load profiles. To mitigate these effects, the load profiles generated by the neural network can be compared to average historic load information for the days having the same name as the present day to identify cases where the load profiles generated by the neural network are greater than a predetermined number (e.g., substantially two or more) standard deviations of the average of historic load information for the days having the same name as the present day. This technique can beneficially limit errors in the load profiles due to noise and other errors.

In some embodiments, once the BPMS creates a load profile for the present day, the BPMS can update (e.g., actively correct) the load profile for the present day with a real-time control algorithm. The real-time control algorithm can perform a real-time loop analysis of a portion of the load profile remaining for the present day. In some examples, the BPMS can perform the real-time loop analysis of the portion of the load profile remaining for the present day substantially once per minute or another practicable period. Utility companies typically meter loads at fifteen-minute intervals, thus performing real-time loop analysis at intervals less than fifteen minutes can level power consumption detected by the utility (e.g., the combined building load readback curve 412) over time to perform load shifting, to perform peak shaving, or a combination thereof. Further details about actively correcting the load predictions are provided herein.

The BPMS can provide outputs based on the load profile prediction, such as instructions to a battery controller directing the battery controller to at least one of (i) keep the battery substantially idle, (ii) charge the battery at a specific rate (e.g., positive for discharge, negative for charge) (e.g., in kW), or (iii) discharge the battery at a specific rate (e.g., positive for discharge, negative for charge) (e.g., in kW). The BPMS can calculate a not-to-exceed load level based on the BPMS predicted load profile and available battery capacity.

In examples, the BPMS can use the load prediction for the present day to identify times to substantially idle the battery, times to charge the battery, times to discharge the battery, or a combination thereof. For example, the BPMS can determine a quantity of energy remaining in the battery from battery state of charge information. The BPMS can compare the quantity of energy remaining in the battery to area under the predicted load to identify times and quantities of energy to discharge from the battery to perform load shifting, to perform peak shaving, or a combination thereof. For example, during periods of time when the power of the predicted load curve is above substantially one-half of the energy stored in the battery, then the battery can be discharged up to the maximum capacity of the battery. Periods of time when the difference is the greatest can be peak times to prioritize battery discharge. During periods of time when the power of the predicted load curve is below substantially one-half of the energy stored in the battery, then the battery can be charged up to the maximum capacity of the battery. Charging the battery during times when load demand is lower than the predicted load curve can advantageously enable storing energy to hedge against the predicted load curve being in error at a later time in the day.

Referring to the example in FIGS. 4A-4H, the combined building load readback curve 412 indicates actual building load (i.e., building load curve 410) plus (i) power going into the battery and/or (ii) power provided by the battery. In an example, combined building load readback curve 412 indicates a load on the electric power source 105 (e.g., a part of a utility service).

The predicted load curve 408 can be updated substantially in real-time by identifying a difference between the predicted load curve 408 and the building load curve 410 and shifting the predicted load curve 408 up or down by the difference. The battery charge and discharge times and amounts can then be recalculated (e.g., to substantially completely discharge the battery during the remainder of the current day to produce a substantially maximum peak shave) based on the shifted predicted load curve.

In some examples, an error can be calculated based on a real load curve (e.g., the combined building load readback curve 412) and the predicted load curve 408. This calculated error can be filtered by a second order filter and then used to correct the predicted load curve 408. In some embodiments, errors due to noise can be removed from the process of recalculating the predicted load curve 408 by applying a filter such as a second-order filter to the building load curve 410 prior to recalculating a building not-to-exceed load level. The effects of the filter are depicted in FIGS. 4A-4D as the combined building load readback curve 412 approaching the building load curve 410 in a substantially smooth manner. After preparing the corrected predicted load curve, the not-to-exceed load level can be recalculated.

In some examples, the BPMS and the battery controller can update the building not-to-exceed load level based on a quantity of energy stored in the battery. In some examples, the BPMS and the battery controller can detect the quantity of energy stored in the battery. If actual load is greater than the predicted load curve, the building not-to-exceed load level can be raised based on the quantity of energy stored in the battery. If actual load is less than the predicted load curve, the building not-to-exceed load level can be lowered based on the quantity of energy stored in the battery.

The BPMS can form charge commands, discharge commands, or both, based on the predicted load curve. The BPMS in turn can issue the charge commands, the discharge commands, or both to a battery controller. In some examples, the BPMS can be integrated with the battery controller in a single device.

In some examples, the BPMS [battery power management system] can send, to the battery controller, instructions configured to cause the battery to be deep cycled (e.g., heavily discharged) over a short period of time, such as to extend battery life. An example of deep cycling is depicted by a deep downward spike in combined building load readback curve 412 in FIG. 4D between 22:00 and 23:00. In some embodiment, deep cycling may also be performed to meet contractual requirements for discharging a certain quantity of power from the battery on a periodic basis (e.g., daily). In some examples, deep cycling can be enabled only after the predicted load curve indicates that no further peaks are predicted for the day.

The load profile prediction can be sent to a discharge management routine, which can determine the not-to-exceed load level (e.g., a kilowatt (kW) level to which the on-site portion of the system should substantially be held to while fully discharging a useable battery system capacity). Over a course of a day, the BPMS can monitor the load, a state-of-charge (SOC) of the battery system, and a quantity of energy delivered to the on-site portion of the system, the load, or both. When the load profile prediction deviates from an actual load, the BPMS can compensate by calculating a new load level that can provide a substantially full discharge of the battery for the day.

The BPMS can command a discharge rate appropriate to maintain a predicted substantially maximum load flat curve for a peak event.

In an example, when within a utility average peak interval (e.g., a fifteen-minute utility average peak interval, an average peak load is predicted to exceed a pre-calculated value for the interval by a threshold amount (e.g., a percentage, a quantity of energy), the BPMS can command an increased discharge rate within the utility average peak interval and recalculate the load profile prediction for a remainder of the day to minimize peak utility load should the trend continue.

The BPMS can maintain a daily running total battery discharge quantity (e.g., in kWh). In an example, once a predicted daily peak demand time is passed by two successive intervals, the BPMS can direct a battery discharge at a rate necessary to ensure that a certain quantity of energy is discharged during peak and near peak times of a day.

When the battery system is coupled to an alternate energy source (e.g., solar power, hydropower, wind power, geothermal power, etc.), the BPMS can prioritize charging during periods of excess energy production by the alternate energy source. This technique can offset losses experienced when net metering is unfavorable, as well as increase a probability of maximum customer peak reduction. In examples, when the BPMS decides the operation is outside of peak operating times, the BPMS can issue instructions to charge of the battery. In some embodiments, the BPMS can issue instructions to charge the battery during preset time periods (e.g., only during preset time periods).

In some examples, bimodal peaks in load profile prediction can be considered separately from other features of the load profile prediction. During periods when bimodal peaks are present in load profile prediction, the BPMS can charge the battery in the "trough" between the peaks (e.g., up to a full charge) in preparation for the second peak.

In an example, during peak or near-peak hours, prior to a predicted daily peak load, and when a load is less than a not-to-exceed quantity, the BPMS can issue instructions to charge the battery to substantially a full charge to substantially maximize a probability of achieving optimal peak shaving during that day.

In some examples, during off-peak hours, the BPMS can issue instructions to begin charging at a rate that maintains substantially zero net utility load until the battery is substantially fully charged.

An alternative method for the BPMS to produce predicted load curves can include performing a piecewise linear regression on historic load information to produce protoshapelets having varying length, slope, and shape. The protoshapelets can be combined to form shapelets having a landmark that is a unique interpretation of a load profile. The landmarks can be identified by comparing the shapelet information to historic load information to identify a frequency of occurrence of the landmark. If the landmark frequently occurs, then the shapelet is a unique feature in the historic load information. The shapelet can be assigned to a category in a group of categories of shapelets. Shapelets formed by historic load information can be applied by the BPMS to a Bayesian Belief Network to identify probabilities of typical transitions between specific categories of shapelets. The BPMS can then create (or update) a probability map of how one shapelet likely leads to other categories of shapelets. Thus, when an initial shapelet is identified, the BPMS can produce a predicted load profile based on the initial shapelet, the categories of shapelets, and the probability map. In some examples, the BPMS can apply a noise-limiting strategy to the shapelets in a form of a low-pass filter or a reinforcement learning neural network in which the neural network is rewarded for taking actions that result in improved accuracy of a predicted load curve.

In an example, protoshapelet information, shapelet information, or both may be sent to a remote server (e.g., from multiple BPMSs) for agglomeration and categorization. Agglomerating protoshapelet information, shapelet information can beneficially result in increased accuracy of categories of shapelets and the probability maps due to an economy of scale. The remote server can also create probability maps and send information describing the categories of shapelets and the probability maps to the BPMS. Thus, historic load information from multiple sites can be leveraged to accurately predict load curves for other sites that can be subject to common occurrences. For example, if sites one and two both experience a first load transition (i.e., identified by a first landmark) prior to a second load transition, then when site three experiences the first load transition (i.e., identifiable by the first landmark), the predicted load curve for site three can be prepared with an expectation that site three will also experience the second load transition at least to some extent.

In some examples, steps for determining the predicted load curve and applying the predicted load curve may be repeated on a periodic basis (e.g., daily). In some embodiments, the steps for determining the predicted load curve and applying the predicted load curve may be performed on a periodic time basis other than daily.

As used hereby, the term "example" means "serving as an example, instance, or illustration". Any example described as an "example" is not necessarily to be construed as preferred or advantageous over other examples. Likewise, the term "examples" does not require all examples include the discussed feature, advantage, or mode of operation. Use of the terms "in one example," "an example," "in one feature," and/or "a feature" in this specification does not necessarily refer to the same feature and/or example. Furthermore, a particular feature and/or structure can be combined with one or more other features and/or structures. Moreover, at least a portion of the apparatus described hereby can be configured to perform at least a portion of a method described hereby.

It should be noted the terms "connected," "coupled," and any variant thereof, mean any connection or coupling between elements, either direct or indirect, and can encompass a presence of an intermediate element between two elements which are "connected" or "coupled" together via the intermediate element. Coupling and connection between the elements can be physical, logical, or a combination thereof. Elements can be "connected" or "coupled" together, for example, by using one or more wires, cables, printed electrical connections, electromagnetic energy, and the like. The electromagnetic energy can have a wavelength at a radio frequency, a microwave frequency, a visible optical frequency, an invisible optical frequency, and the like, as practicable. These are several non-limiting and non-exhaustive examples.

The term "signal" can include any signal such as a data signal, an audio signal, a video signal, a multimedia signal, an analog signal, a digital signal, and the like. Information and signals described hereby can be represented using any of a variety of different technologies and techniques. For example, data, an instruction, a process step, a process block, a command, information, a signal, a bit, a symbol, and the like which are referred to hereby can be represented by a voltage, a current, an electromagnetic wave, a magnetic field, a magnetic particle, an optical field, an optical particle, and/or any practical combination thereof, depending at least in part on the particular application, at least in part on the desired design, at least in part on the corresponding technology, and/or at least in part on like factors.

A reference using a designation such as "first," "second," and so forth does not limit either the quantity or the order of those elements. Rather, these designations are used as a convenient method of distinguishing between two or more elements or instances of an element. Thus, a reference to first and second elements does not mean only two elements can be employed, or the first element must necessarily precede the second element. Also, unless stated otherwise, a set of elements can comprise one or more elements. In addition, terminology of the form "at least one of: A, B, or C" or "one or more of A, B, or C" or "at least one of the group consisting of A, B, and C" used in the description or the claims can be interpreted as "A or B or C or any combination of these elements". For example, this terminology can include A, or B, or C, or A and B, or A and C, or A and B and C, or 2A, or 2B, or 2C, and so on.

The terminology used hereby is for the purpose of describing particular examples only and is not intended to be limiting. As used hereby, the singular forms "a," "an," and "the" include the plural forms as well, unless the context clearly indicates otherwise. In other words, the singular portends the plural, where practicable. Further, the terms "comprises," "comprising," "includes," and "including," specify a presence of a feature, an integer, a step, a block, an operation, an element, a component, and the like, but do not necessarily preclude a presence or an addition of another feature, integer, step, block, operation, element, component, and the like.

Those of skill in the art will appreciate the example logical blocks, elements, modules, circuits, and steps described in the examples disclosed hereby can be implemented individually and/or collectively, as electronic hardware, computer software, or combinations of both, as practicable. To clearly illustrate this interchangeability of hardware and software, example components, blocks, elements, modules, circuits, and steps have been described hereby generally in terms of their functionality. Whether such functionality is implemented as hardware or software depends upon the particular application and design constraints imposed on an overall system. Skilled artisans can implement the described functionality in different ways for each particular application, but such implementation decisions should not be interpreted as causing a departure from the scope of the present disclosure. In addition, any disclosure of components contained within other components should be considered example in nature since many other architectures can be implemented to achieve the same functionality.

At least a portion of the methods, sequences, algorithms or a combination thereof which are described in connection with the examples disclosed hereby can be embodied directly in hardware, in instructions executed by a processor (e.g., a processor described hereby), or in a combination thereof. In an example, a processor includes multiple discrete hardware components. Instructions can reside in a non-transient storage medium (e.g., a memory device), such as a random-access memory (RAM), a flash memory, a read-only memory (ROM), an erasable programmable read-only memory (EPROM), an electrically erasable programmable read-only memory (EEPROM), a register, a hard disk, a removable disk, a compact disc read-only memory (CD-ROM), any other form of storage medium, the like, or a combination thereof. An example storage medium (e.g., a memory device) can be coupled to the processor so the processor can read information from the storage medium, write information to the storage medium, or both. In an example, the storage medium can be integral with the processor.

Further, examples provided hereby are described in terms of sequences of actions to be performed by, for example, one or more elements of a computing device. The actions described hereby can be performed by a specific circuit (e.g., an application specific integrated circuit (ASIC)), by instructions being executed by one or more processors, or by a combination of both. Additionally, a sequence of actions described hereby can be entirely within any form of non-transitory computer-readable storage medium having stored thereby a corresponding set of computer instructions which, upon execution, cause an associated processor (such as a special-purpose processor) to perform at least a portion of a function described hereby. Additionally, a sequence of actions described hereby can be entirely within any form of non-transitory computer-readable storage medium having stored thereby a corresponding set of instructions which, upon execution, configure the processor to create specific logic circuits. Thus, examples may be in a number of different forms, all of which have been contemplated to be within the scope of the disclosure. In addition, for each of the examples described hereby, a corresponding electrical circuit of any such examples may be described hereby as, for example, "a logic circuit configured to" perform a described action.

In an example, when a general-purpose computer (e.g., a processor) is configured to perform at least a portion of a method described hereby, then the general-purpose computer becomes a special-purpose computer which is not generic and is not a general-purpose computer. In an example, loading a general-purpose computer with special programming can cause the general-purpose computer to be configured to perform at least a portion of a method described hereby. In an example, a combination of two or more related method steps disclosed hereby forms a sufficient algorithm. In an example, a sufficient algorithm constitutes special programming. In an example, special programming constitutes any software which can cause a computer (e.g., a general-purpose computer, a special-purpose computer, etc.) to be configured to perform one or more functions, features, steps algorithms, blocks, or a combination thereof, as disclosed hereby.

At least one example provided hereby can include a non-transitory (i.e., a non-transient) machine-readable medium and/or a non-transitory (i.e., a non-transient) computer-readable medium storing processor-executable instructions configured to cause a processor (e.g., a special-purpose processor) to transform the processor and any other cooperating devices into a machine (e.g., a special-purpose processor) configured to perform at least a part of a function described hereby, at least a part of a method described hereby, the like, or a combination thereof. Performing at least a part of a function described hereby can include initiating at least a part of a function described hereby, at least a part of a method described hereby, the like, or a combination thereof. In an example, execution of the stored instructions can transform a processor and any other cooperating devices into at least a part of an apparatus described hereby. A non-transitory (i.e., a non-transient) machine-readable medium specifically excludes a transitory propagating signal. Further, one or more examples can include a computer-readable medium embodying at least a part of a function described hereby, at least a part of a method described hereby, the like, or a combination thereof. A non-transitory (i.e., a non-transient) machine-readable medium specifically excludes a transitory propagating signal.

In some examples, at least a portion of example energy supply system 100 in FIG. 1, at least a portion of example computing device 200 in FIG. 2, or both can represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

Nothing stated or depicted in this application is intended to dedicate any component, step, block, element, feature, object, benefit, advantage, or equivalent to the public, regardless of whether the component, step, block, element, feature, object, benefit, advantage, or the equivalent is recited in the claims. While this disclosure describes examples, changes and modifications can be made to the examples disclosed hereby without departing from the scope defined by the appended claims. A feature from any of the provided examples can be used in combination with one another feature from any of the provided examples in accordance with the general principles described hereby. The present disclosure is not intended to be limited to the specifically disclosed examples alone.

What is claimed is:

1. A computer-implemented method for controlling a battery, at least a portion of the method being performed by a computing device comprising at least one processor, the method comprising:
   creating, using a machine-learning model, a load prediction curve for a load for a current day;
   analyzing, to control peak energy use from an electric power source at a specific time, the load prediction curve to identify the specific time and a respective quantity of energy to transfer between the battery and a bus coupled between the electric power source and the load;
   generating a battery controller input based on the identified respective quantity of energy to transfer; and
   controlling, responsive to the battery controller input, a battery charge controller, wherein the battery controller input causes the battery charge controller to deep cycle the battery after the load prediction curve for the load for the current day indicates no further peaks are predicted for the current day by charging and discharging the battery.

2. The computer-implemented method of claim 1, further comprising:
   receiving information from which the load prediction curve for the load can be created; and
   training, using the information, the machine-learning model,
   wherein the received information comprises:
      historical data describing power demand by a load;
      a load profile for a prior day;
      a load value of a profile used for designing a discharge plan;
      a real-time utility load;
      a time of day; and
      a calendar date.

3. The computer-implemented method of claim 1, further comprising:
   extracting features from historical data describing power demand by the load; and
   training the machine-learning model with the extracted features.

4. The computer-implemented method of claim 1, further comprising:
   detecting outliers in historical data describing power demand by the load;
   modifying the historical data by discarding outlier data from the historical data; and
   training the machine-learning model with the modified historical data.

5. The computer-implemented method of claim 1, wherein the machine-learning model is a time-series neural network.

6. The computer-implemented method of claim 1, wherein the identifying the specific time and the respective quantity of energy to transfer between the battery and the bus is configured to perform at least one of peak shifting, peak shaving, or peak reducing.

7. The computer-implemented method of claim 1, further comprising training the machine-learning model with portions of information for an immediately prior day that are within one standard deviation of average historic load information for prior days of the same name.

8. The computer-implemented method of claim 1, wherein:
   the analyzing includes identifying a predicted daily peak load; and
   the battery controller input further causes the battery charge controller to, prior to the predicted daily peak load and when a load is less than a not-to-exceed quantity, charge the battery to a full charge.

9. A system for controlling a battery, the system comprising:
   a battery charge controller;
   a physical processor; and
   a memory communicably coupled to the physical processor and storing instructions configured to cause the physical processor to:
      create, using a machine-learning model, a load prediction curve for a load for a current day;
      analyze, to control peak energy use from an electric power source at a specific time, the load prediction curve to identify the specific time and a respective quantity of energy to transfer between the battery and a bus coupled between the electric power source and the load;
      generate a battery controller input based on the identified respective quantity of energy to transfer; and
      control, responsive to the battery controller input, the battery charge controller, wherein the battery controller input causes the battery charge controller to deep cycle the battery after the load prediction curve for the load for the current day indicates no further peaks are predicted for the current day by charging and discharging the battery.

10. The system of claim 9, wherein the memory further stores instructions configured to cause the physical processor to:
    receive information from which the load prediction curve for the load can be created; and
    train, using the information, the machine-learning model,
    wherein the received information comprises:
       historical data describing power demand by a load;
       a load profile for a prior day;
       a load value of a profile used for designing a discharge plan;
       a real-time utility load;
       a time of day; and
       a calendar date.

11. The system of claim 9, wherein the memory further stores instructions configured to cause the physical processor to:
    extract features from historical data describing power demand by the load; and
    train the machine-learning model with the extracted features.

12. The system of claim 9, wherein the memory further stores instructions configured to cause the physical processor to:
    detect outliers in historical data describing power demand by the load;
    modify the historical data by discarding outlier data from the historical data; and
    train the machine-learning model with the modified historical data.

13. The system of claim 9, wherein the machine-learning model is a time-series neural network.

14. The system of claim 9, wherein the identifying the specific time and the respective quantity of energy to transfer between the battery and the bus is configured to perform at least one of peak shifting, peak shaving, or peak reducing.

15. The system of claim 9, wherein the physical processor is at least one of a microprocessor, a microcontroller, a digital signal processor, a field programmable gate array, a programmable logic device, an application-specific integrated circuit, a controller, a non-generic special-purpose processor, a state machine, a gated logic device, a discrete hardware component, or a dedicated hardware finite state machine.

16. A non-transitory computer-readable medium comprising one or more computer-executable instructions stored thereon that, when executed by at least one processor of a computing device, cause the computing device to:
created, using a machine-learning model, a load prediction curve for a load for a current day;
analyze, to control peak energy use from an electric power source at a specific time, the load prediction curve to identify the specific time and a respective quantity of energy to transfer between a battery and a bus coupled between the electric power source and the load;
generate a battery controller input based on the identified respective quantity of energy to transfer; and
control, responsive to the battery controller input, a battery charge controller, wherein the battery controller input causes the battery charge controller to deep cycle the battery after the load prediction curve for the load for the current day indicates no further peaks are predicted for the current day by charging and discharging the battery.

17. The non-transitory computer-readable medium of claim 16, wherein the computer-executable instructions are further configured to cause the computing device to:
receive information from which the load prediction curve for the load can be created; and
train, using the information, the machine-learning model, wherein the received information comprises:
historical data describing power demand by a load;
a load profile for a prior day;
a load value of a profile used for designing a discharge plan;
a real-time utility load;
a time of day; and
a calendar date.

18. The non-transitory computer-readable medium of claim 16, wherein the computer-executable instructions are further configured to cause the computing device to:
extract features from historical data describing power demand by the load; and
train the machine-learning model with the extracted features.

19. The non-transitory computer-readable medium of claim 16, wherein the computer-executable instructions are further configured to cause the computing device to:
detect outliers in historical data describing power demand by the load;
modify the historical data by discarding outlier data from the historical data; and
train the machine-learning model with the modified historical data.

20. The non-transitory computer-readable medium of claim 16, wherein the machine-learning model is a time-series neural network.

21. The non-transitory computer-readable medium of claim 16, wherein the identifying the specific time and the respective quantity of energy to transfer between the battery and the bus is configured to perform at least one of peak shifting, peak shaving, or peak reducing.

* * * * *